(12) United States Patent
Sloot (10) Patent No.: US 6,644,818 B2
(45) Date of Patent: Nov. 11, 2003

(54) RETROREFLECTIVE PRISMATIC RETRO-REFLECTORS WITHOUT VISUALLY DISTURBING SEAMS

(75) Inventor: Alexander Sloot, Sugarloaf, PA (US)

(73) Assignee: Printmark Industries, Inc., Hazelton, PA (US)

(*) Notice: Subject to any disclaimer, the term of this patent is extended or adjusted under 35 U.S.C. 154(b) by 0 days.

(21) Appl. No.: 10/137,243

(22) Filed: May 1, 2002

(65) Prior Publication Data

US 2002/0186472 A1 Dec. 12, 2002

Related U.S. Application Data

(63) Continuation-in-part of application No. 09/678,869, filed on Oct. 2, 2000, now Pat. No. 6,508,558.

(51) Int. Cl.⁷ .......................... G02B 5/124; F16G 5/00; B29D 11/00
(52) U.S. Cl. ...................... 359/530; 359/529; 359/900; 156/140; 264/1.9
(58) Field of Search .................. 359/529, 530, 359/900; 156/140, 304.1, 304.2, 304.5, 304.6; 264/1.9, 1.1, 166

(56) References Cited

U.S. PATENT DOCUMENTS

| | | | | |
|---|---|---|---|---|
| 3,811,938 A | * | 5/1974 | Rowland | 156/245 |
| 5,171,624 A | * | 12/1992 | Walter | 428/156 |
| 5,657,162 A | * | 8/1997 | Nilsen et al. | 359/530 |
| 5,840,405 A | * | 11/1998 | Shusta et al. | 428/156 |
| 6,036,322 A | * | 3/2000 | Nilsen et al. | 359/529 |
| 6,322,652 B1 | * | 11/2001 | Paulson et al. | 156/218 |

* cited by examiner

Primary Examiner—James Phan
(74) Attorney, Agent, or Firm—St. Onge Steward Johnston & Reens LLC (57) ABSTRACT

A method and apparatus for making retro-reflective articles are described which can be made without visually disturbing seam lines, In one embodiment molds having retro-reflective elements have serrated edges along boundary lines of retro-reflective elements are used. In another embodiment the molds are provided with mold lines aligned with edges of the molds and so spaced from the edges that molds can be placed adjacent to one another as part of a grid pattern wherein seam lines are a part of the grid pattern and thus visually hidden. In another embodiment, rather than grid lines being introduced into the molds used to form retro-reflective sheets, the grid lines are formed directly on or in the retro-reflective material itself during or after creation. Articles made with molds having mold lines exhibit a regular grid pattern, but without an asymmetric seam line appearing on the article.

13 Claims, 7 Drawing Sheets

RETROREFLECTIVE PRISMATIC RETRO-REFLECTORS WITHOUT VISUALLY DISTURBING SEAMS

RELATED APPLICATIONS

This patent application is a continuation-in-part of U.S. patent application Ser. No. 09/678,869, filed Oct. 2, 2000, U.S. Pat. No. 6,508,558.

FIELD OF THE INVENTION

The invention relates to a method and apparatus for making retro-reflective sheets having prismatic reflectors and more particularly a method and apparatus for manufacturing prismatic reflective vinyl sheets where seam lines produced from edges between adjacent prismatic molds can be visually either eliminated or disguised.

BACKGROUND OF THE INVENTION

It is known in the art to use very finely engraved molds and dies in a myriad of applications such as holographics, lenticular lenses, fresnel lenses, prismatic reflective materials, diffractive metallized products and the like. In many of these applications the molds are used to form these articles by pressing against a raw material such as vinyl and the molds require extremely fine and micro-detailed features.

Such micro-fine detail is especially required for the making of molds needed to produce prismatic reflective materials in vinyl sheets. Generally such micro-fine tooling is made with diamond turning equipment. This equipment allows very fine reflective structures to be created in the form of tiny three-sided pyramids, which result in cube corner reflective elements once the mold is pressed into a vinyl sheet or if a liquid resin is cast onto the mold then solidified or radiation cured onto a vinyl polyester or other thermoplastic sheet. Tiny micro-pyramids of four or more sides, as well as with different sizes or shapes can also be made with this method.

Retro-reflective sheeting comprised of prismatic cube corner formations are well known in the industry. Rowland U.S. Pat. No. 3,811,983 describes one method for making such materials. Tooling for these cube corner structures is also referenced in this patent. The tooling described in this patent details the size of the cube corners as being 0.00235" in depth and 0.0056" on a side. This indicates that these are extremely fine structures, with a surface quantity of over 40,000 per square inch. Such fine structures are still widely employed and utilized today, but multiple molds with such fine structures cannot be joined, seamed, tiled or otherwise butted together without forming visibly apparent seam lines of some sort on the vinyl or other thermoplastic substrate.

In U.S. Pat. No. 5,171,624 prismatic molds are shown where some of the prisms have flat sides, and others are arcuate; some even have their axes tilted. While U.S. Pat. No. 5,657,162 deals with adding a reflective coating to reflective material, much reference is made to the prismatic reflective dies needed to make this material. In this case the dies shown have prisms of different sizes and angles.

But in the aforementioned patents, no matter what the prism size, the angles or the position of the axes of the prisms, there is a maximum size to which a micro-fine prismatic mold can be made. When another mold is joined to the first one to make a larger retro-reflective sheet, unwanted seam lines will appear on the mold, and then ultimately appear on the finished reflective sheet material.

U.S. Pat. No. 6,036,322 refers to similar retro-reflective structures with cube-corner reflective elements, and where the elements are oriented in different directions. What is taught here is how the elements can be oriented first in one direction and then in a second direction at 90° to the first direction. It goes on to show that a third array can be oriented at 180° to the first direction, and a fourth array at 270° to the first direction. When looking at the patent drawings, this clearly shows seam lines between each array of prism directions, which seams are derived from making the tooling for these micro-prisms.

As used herein, prismatic retro-reflective articles include cube corner and prismatic as well as other shapes of retro-reflective elements formed into a plastic material made by pressing a die into it, or applying a liquid resin onto the mold, curing it to solidify it on a thermoplastic substrate.

There are angularity advantages by orienting the prisms in these different directions, but by doing this, more internal joint-lines than usual will appear across the face of the ultimate reflective product. In addition to this angling of prisms, when a first mold is joined to the next mold for manufacturing, a distinct seam line will appear between each mold.

With current technology, it is virtually impossible to eliminate unwanted seam lines in the manufacture of prismatic retro-reflective materials in large sheets. There are limitations on how big one can make a single mold in a diamond turning machine. Some machines can produce a continuous flawless pattern of micro-prisms at a size of 8"×8"; some at 9"×9"; some at 9"×10" and some equipment possibly even slightly larger than this. However, in the manufacture of larger retro-reflective sheets or in the case of continuous roll-goods production, multiple molds will be needed and one or more visually disturbing seams would, therefore, become apparent. Also, the larger molds are expensive to make and thus increase the costs of the retro-reflective articles made with them.

As technology improves the mold plate sizes may even get larger. But even if the die plates can be made larger, when such molds are installed on manufacturing equipment, whether as flat plates or in rotary form, at some point the mold either has to be butted to another mold, or it has to wrap around a cylinder to meet itself. When a mold is joined to another, or if wrapped to join to itself, a seam line will appear. This seam line will show up on the reflective material manufactured from the prismatic mold. In some instances seam lines may be acceptable, and up until now they have had to be acceptable. In other instances seam lines are unacceptable especially in consumer reflector products. When making a large number of small consumer reflectors out of a large sheet of flexible prismatic materials, the product fabricating dies have had to work within the confines of the largest prismatic mold size such as 9"×9" or 9"×10".

What is desired, therefore, is a way to eliminate the visually disturbing appearance of seams on retro-reflective materials made from prismatic manufacturing molds.

SUMMARY OF THE INVENTION

It is, therefore, an object of the present invention to provide prismatic reflective articles without visually disturbing seam lines and a method for making such articles.

Still another object of the invention is to provide a way to remove the visually disturbing presence of seam lines from such retro-reflective articles where multiple molds, used to make the articles, may need to be butted together.

It is yet another object of the invention to provide a way to hide a seam line from prismatic retro-reflective articles where one or more flexible metal or synthetic molds form a complete wrap around a cylinder for the manufacture of prismatic retro-reflective materials in a continuous manner.

Another object of the invention is to provide a way to completely remove seam lines from prismatic retro-reflective structures where one or more flexible molds have been wrapped around a cylinder in a method for continuous cylindrical manufacturing of the retro-reflective materials.

Yet another objective of the invention is to provide a way to remove visually disturbing seam lines from a retro-reflective material using economically small sized diamond-turned master molds and using electro formed duplicate molds in a tiled configuration to create larger master molds.

These objectives of this invention are achieved by utilizing either a meshing technique or a disguise technique used in the manufacture of the dies for forming prismatic retro-reflector articles in accordance with the invention.

In one embodiment in accordance with the invention a mold is formed in which prismatic elements are inscribed and where regularly spaced grid lines are added. These additional grid lines are separated by spacings that are so selected that an actual seam line formed by abutting molds would appear as a regular grid line and thus no longer appear as a visually disturbing seam line in a prismatic retro-reflective article made with the mold. Such seam hiding is particularly effective when micro fine prisms are used on the mold and enables the manufacture of continuous retro-reflective sheeting bearing prismatic retro-reflectors.

Hence, when making very fine precise prismatic tooling for retro-reflective cube-corner prisms, this invention teaches one how to hide the seam lines arising from joined mold structures, or occurring where mold edges meet each other.

In another embodiment in accordance with the invention a prismatic mold can be made having a fairly coarse prism structure, and wherein the prisms along an edge of the mold are arranged to mesh with those of a corresponding and abutting mold to effectively eliminate a visually disturbing seam in a retro-reflective sheet formed with the abutting molds.

In a further embodiment, a prismatic reflective material is produced in which no join lines or seam lines are apparent by forming the grid lines directly on or in the retro-reflective material itself during or after creation. In this process, at least one mold is provided having prismatic elements therein for making a prismatic retro-reflector with the at least one mold in a thermoplastic substrate. Edges of the at least one mold are abutted to form a mold structure wherein the abutting edges of the mold form a seam line. A retro-reflective thermoplastic sheet is formed with the at least one mold wherein the retro-reflective sheet has a seam line corresponding to the seam line formed by the edges of the at least one mold. A grid pattern is formed on or in the retro-reflective thermoplastic sheet, which grid pattern is positioned such that the seam line in the retro-reflective thermoplastic sheet becomes a part of the grid pattern to be effectively obscured thereby.

Preferably, the grid pattern may be printed or etched on a surface of the retro-reflective thermoplastic sheet. Most preferably, the grid pattern is formed on a surface of the retro-reflective thermoplastic sheet by a method selected from the group consisting of scribing the grid pattern into the retro-reflective thermoplastic sheet with a tool, stamping the grid pattern into the retro-reflective thermoplastic sheet, using a laser to etch the grid pattern into the retro-reflective thermoplastic sheet, printing the grid pattern into the retro-reflective thermoplastic sheet, or by combinations of these.

The grid pattern may be formed on either a front, smooth surface of the retro-reflective thermoplastic sheet or on a rear, prism-containing surface of the retro-reflective thermoplastic sheet. Furthers the retro-reflective thermoplastic sheet may be die-cut to form articles with a regular grid pattern background.

The invention and its particular features will become more apparent from the following detailed description considered with reference to the accompanying drawings.

DETAILED DESCRIPTION OF EMBODIMENTS OF THE INVENTION

Figure 1A:
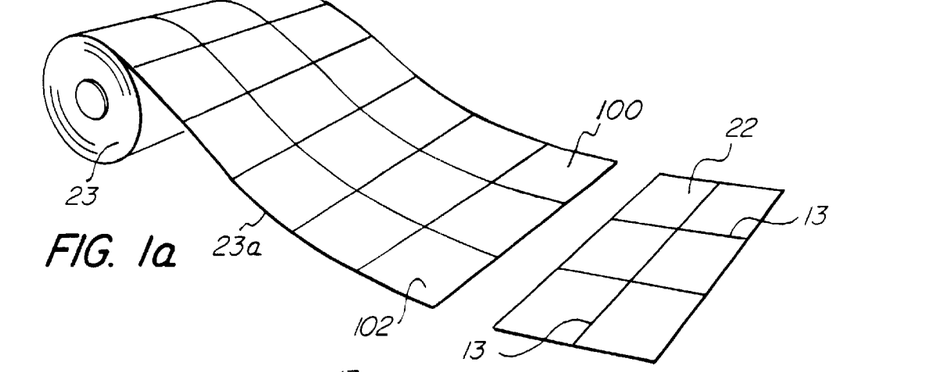
FIG. 1a is a perspective view of a roll of prismatic retro-reflective material showing visually obvious seam lines.
Figure 1B:
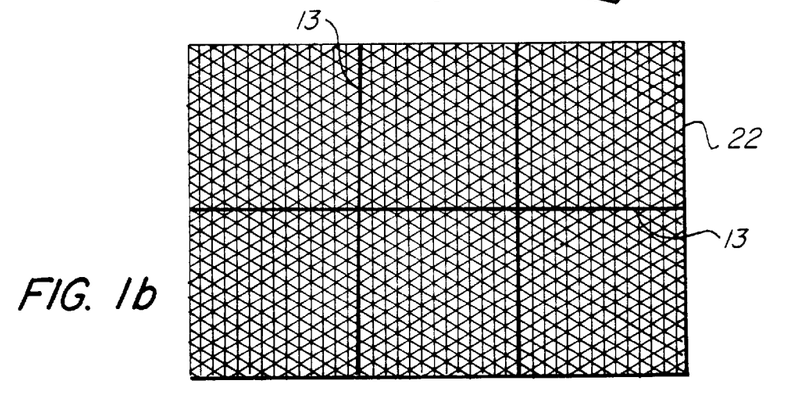
FIG. 1b is a top plan view of a sheet of prismatic retro-reflective material from the roll of FIG. 1a and showing the visually obvious seam lines.

With reference to FIG. 1a and FIG. 1b visually obvious seam lines 13 appear on a roll 23 of a continuous retro-reflective sheet 23a. These seam lines arise because the sheet 23a is formed with a composite prismatic die made with a plurality of abutting dies, which are on a cylinder so that the edges of the dies form the seam lines 13. These seam lines arise by virtue of the size limitations of diamond turning technology in making the dies using micro-fine prisms used to produce the retro-reflective materials. These seam lines 13 will appear when dies are joined or abutted.

FIG. 1*a* seam lines 13 are apparent throughout the roll 23. The original master prismatic mold was made at a size of 9"×9". For manufacturing purposes electro-formed duplicate molds were made from this master and three were joined together to form a 27" wide manufacturing plate. From this 27" wide mold, roll 23 was produced.

FIG. 1*b* shows a sheet 22, which is 18"×27" derived from roll 23. Seam lines 13 appear on this sheet. With current technology for manufacturing very fine dies or molds which contain cube corner structures or elements, seams 13 will appear in the final product when joining these molds together. These seams cannot be eliminated, even when sophisticated "tiling" techniques are used.

For the manufacture of continuous retro-reflective sheeting, whether with more rigid material, such as polycarbonate, or in the flexible area with material such as vinyl, the retro-reflective properties are provided by fine cube corner structures. These prismatic cells can generally range in size from a coarse structure such as 250 per square inch, to a moderately fine structure such as 5,000 per square inch, to a very fine structure such as 25,000 per square inch, or to an extremely fine structure such as over 40,000 per square inch.

Figure 2A:
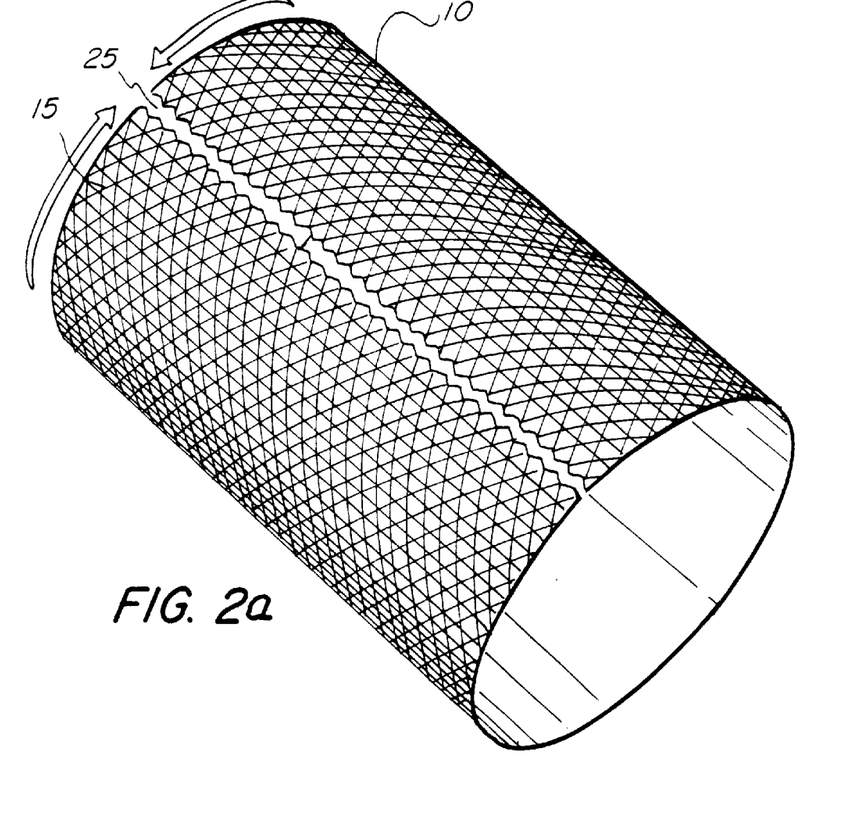
FIG. 2a is a greatly enlarged side perspective view of a prismatic cylindrical mold showing how large cube corner prisms can be meshed together.

When dealing with a coarse structure such as prisms in the range of 250 per square inch and less, it is possible to actually eliminate the seam lines all together, especially in a cylindrical application. This is achieved with serrated edges 11 on the sides of the prismatic molds 10 to be butted together. These serrations are sufficiently precisely located to interfit with each other and thus hide the joint between abutting molds 10. The prisms are coarse enough, so that when, as shown in FIG. 2*a*, the curved mold 10 is wrapped around a cylinder (not shown) to meet itself, the prisms 15 are worked into each other so as to be precisely meshed together as shown at area 25. This would mean that there would be no seam lines at all in this cylindrical mold. The serrations on the sides of molds 10 may have various shapes and preferably are aligned with the coarse prisms.

Figure 2B:
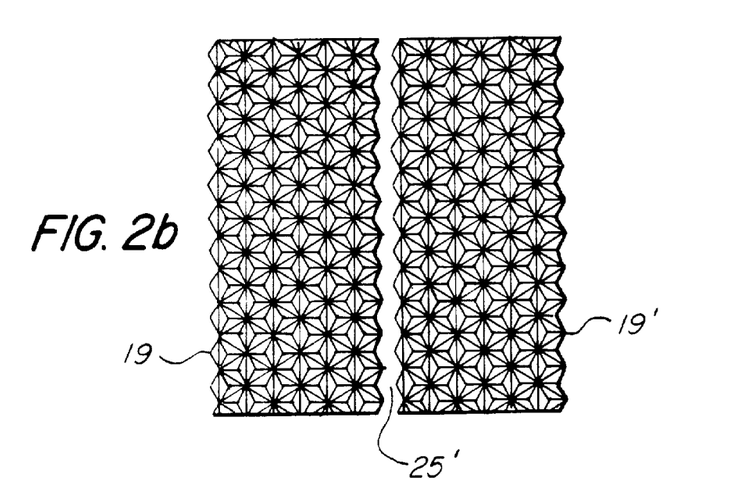
FIG. 2b is a top view of two flat reflective prismatic plates showing how the prisms can be meshed together.

FIG. 2*b* shows how flat molds 19 and 19' would mesh together at area 25' in order to form a seamless die plate. While this meshing currently works for coarse structures in the range of 250 prisms per square inch or less, as technology improves, this may well be accomplished with prismatic cube-corner structures that are finer than 250 and even finer than 500 per square inch. However, at finer retro-reflective structures such as in the range of about 1000 prisms per square inch and higher another technique would be needed to hide the seams 13.

Figures 1C, 1D:
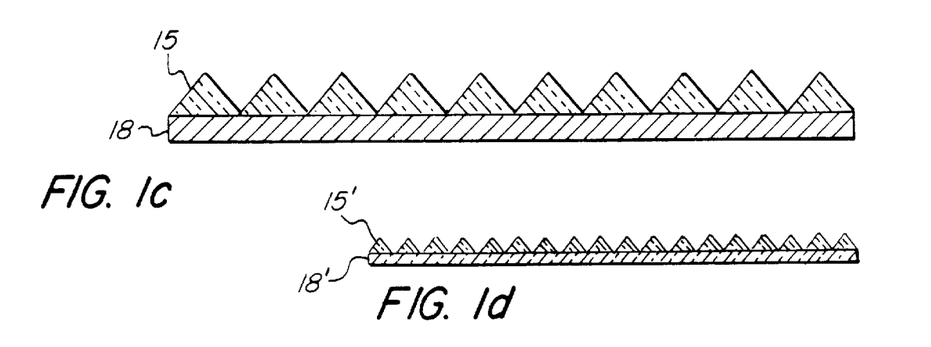
FIG. 1c is a greatly enlarged section view of the retro-reflective material shown in FIG. 1b.
FIG. 1d is a greatly enlarged section view of a retro-reflective material having smaller prisms formed therein than in the material illustrated in FIG. 1c.

A typical automobile rear-light hard-molded reflector employs large prisms in the region of 100 to 150 per square inch. At 132 prisms per square inch for example, within an auto reflector, each actual prism 15 (not including the smooth body of plastic 16) will have a height of about 0.0625", which is 1/16". FIG. 1*c* shows a side section view of a mold 18 where in a coarse structure the prisms 15 will be large in size. As the prism count per square inch is increased, the height of each prism will decrease. So a typical coarse, soft vinyl prismatic reflector with about 250 prisms per square inch will have prisms with a height of about 0.026" which is slightly under 1/32" in thickness. FIG. 1*d* shows a mold 18', which is of a finer structure than FIG. 1*c*, and in this case the prisms are smaller.

If one desired really thin prismatic retro-reflective material, then one would increase the prism count per square inch such as to 25,000 or more. But there still needs to be a carrier film, or a body of clear film to carry the prisms on or to form the prisms on. This means that no matter how tiny the prisms became, the overall thickness of the reflective sheeting (carrier and prisms) would likely not be able to drop below 0.003" in thickness, but more typically would be in the region of 0.005" to 0.020" in thickness.

When utilizing finer prismatic structures or elements such as in excess of 1,000 per square inch, it becomes increasingly difficult if not impossible to mesh together joints (and thereby hide any seams) whether butting plates together or wrapping the mold around a cylinder as shown in FIG. 2*a*. To hide the seam lines in these instances this invention teaches another method.

Figure 7:
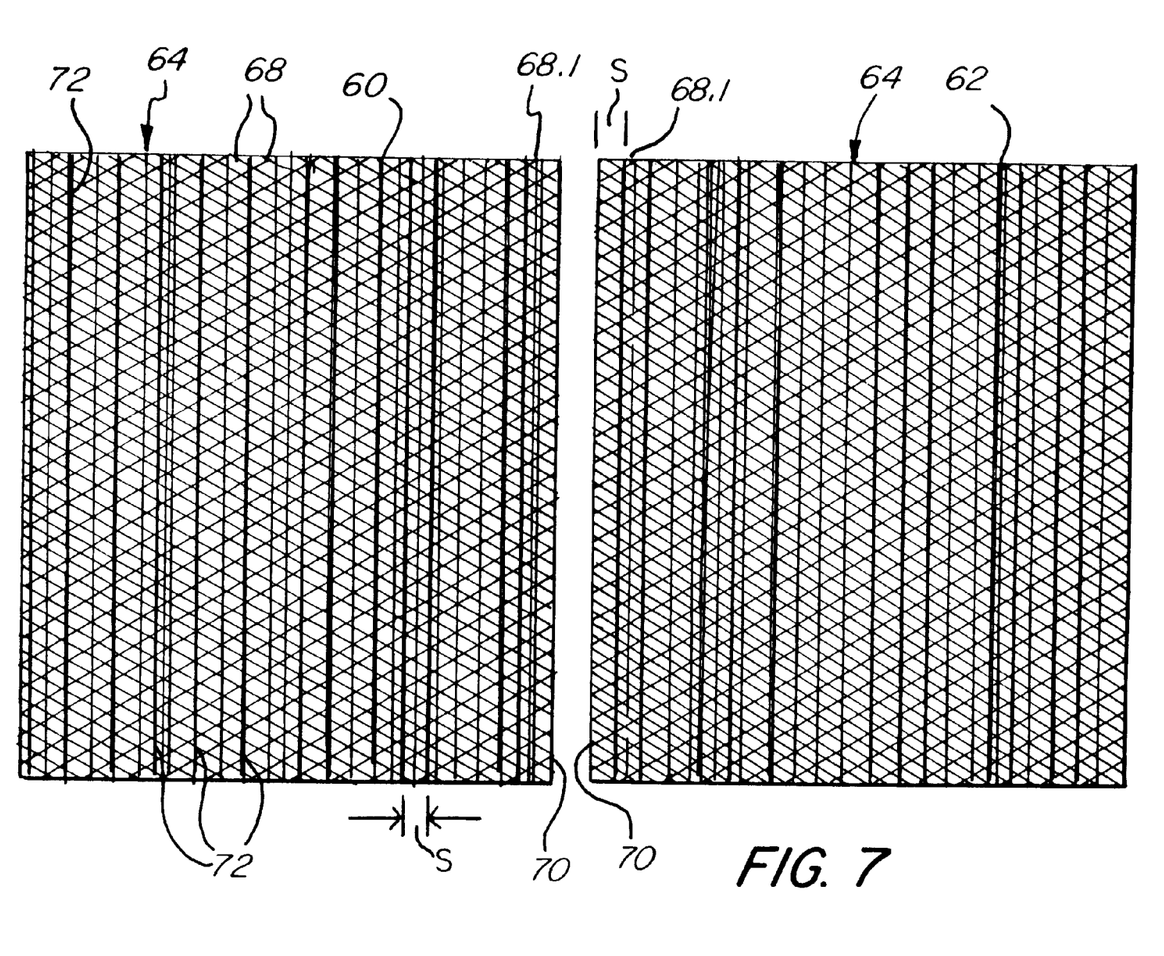
FIG. 7 is a plan view of a pair of like dies for forming retro-reflectors into a plastic substrate and bearing inscribed grid lines to disguise a seam line when the dies are abutted.

With reference to FIG. 7 two planar molds 60 and 62 are shown. Each mold 60 and 62 are alike and have inscribed into them a grid pattern 64 selected to visually hide the actual seam lines that would normally appear when edges of the planar molds are abutted. The grid pattern 64 is formed with a plurality of parallel mold lines 68. The spacing between the mold lines 68 is selected to form a grid structure in which the seam line 13 between abutting molds is an integral but visually disguised part. Hence, when, as shown in FIG. 7, the grid lines 68 are spaced at regular intervals S, the first grid line 68.1 from an edge 70 of mold 60 to be abutted to a similar edge 70 of the other mold 62 is distanced at a spacing S from edge 70. In this manner when molds 60, 62 are buffed together, the seam line 13 appearing between them would be visually obscured as a regular grid line 68.

In FIG. 7 a rectangular grid pattern is formed with mold grid lines 68 and orthogonal mold grid lines 72. It should be understood, however, that the particular mold grid pattern that is used to obscure a seam line might vary depending upon the shape of the edges 70 of molds 60, 62. For example, when the molds 60, 62 have curved edges 70 then the mold grid lines preferably have similar curves so as to appear parallel to the edges and thus obscure the seam line 13 in the finished article. The orthogonal mold grid lines 72 need not always be used.

Figure 3:
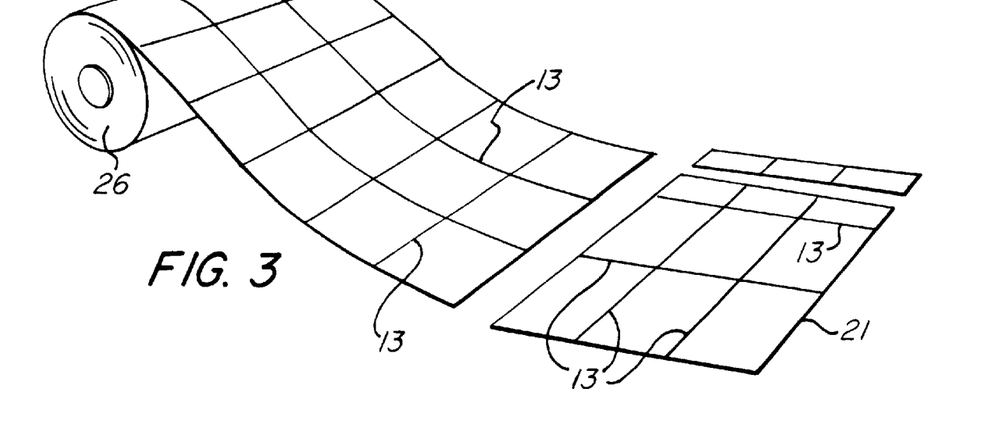
FIG. 3 is a perspective view of a roll of prismatic retro-reflective material, wider than FIG. 1a, showing visually obvious manufacturing seam lines.

FIG. 3 shows a typical sheet of prismatic retro-reflective material 21 coming off a roll 26, which is 30" wide. Described below is a typical mold-making and electro-forming procedure to create a cylindrical mold for production. But note in this description and the drawings how the seam lines cannot be avoided and will appear throughout the total molding tool.

An original diamond turned tool would have been made to a size of perhaps 9"×10" before any seam lines appeared. Three electroformed duplicates of such molds each 10" wide would then be joined (butted) together to from the roll width, which would be 30"×9". From this 30"×9" master, four additional electroformed sets would be joined together, to form a large mold at a size of 30"×36". This would be in the form of a flexible (i.e. fairly thin) electroformed mold in the range of 0.003" to 0.010" in thickness and which would be wrapped around the manufacturing machine cylinder. Seams 13 will thus appear every 9 inches across the 30" width. The diameter of the cylinder would be about 11½". FIG. 3 shows a roll 26, which is the manufacturing result of these steps in making the prismatic mold.

Figure 4A:
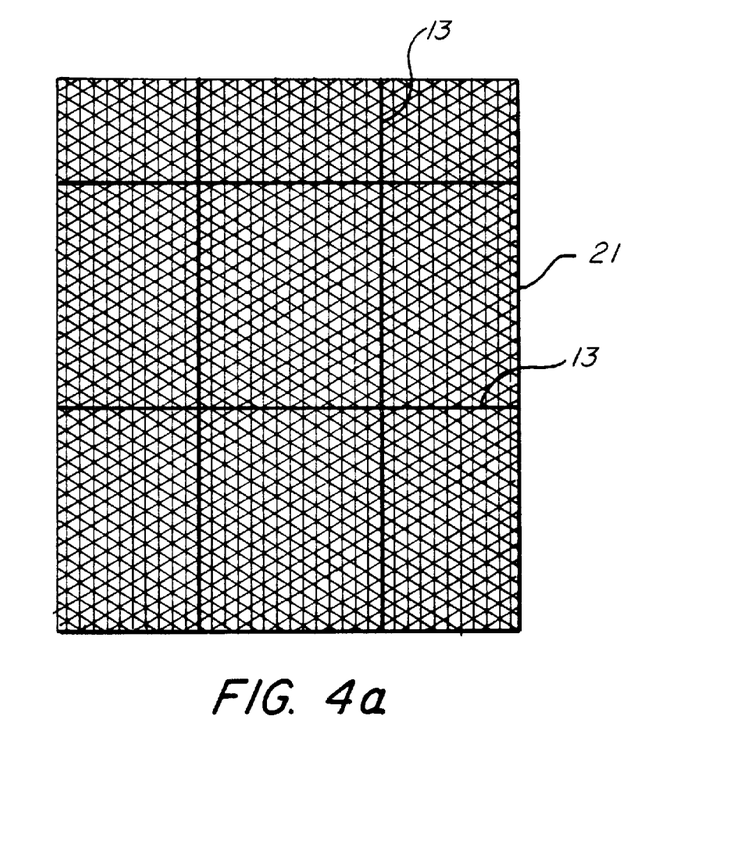
FIG. 4a is a top plan view of a sheet of reflective material derived from the roll in FIG. 3, showing the obvious manufacturing seam lines.

FIG. 4*a* shows a sheet of reflective material 21 cut from this 30" wide roll 26 to a size 20"×24". (The size of the prisms are exaggerated within this drawing.) When needing a sheet this size, note how many seams 13 appear on the sheet of prismatic material.

Figure 4B:
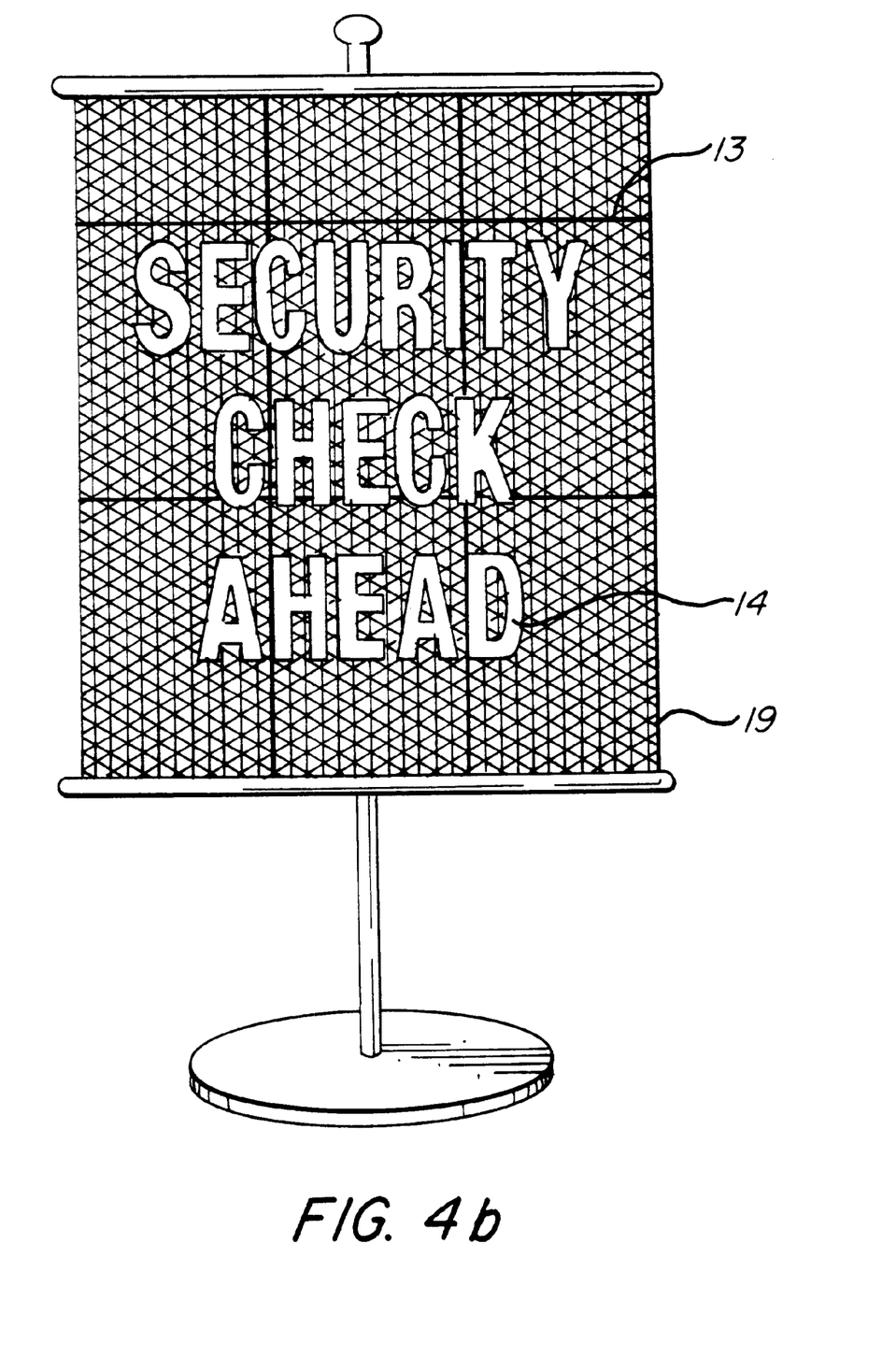
FIG. 4b shows a prismatic retro-reflective warning sign, where the seam lines are visually apparent behind and alongside printed graphics.

If one was fabricating a part such as a prismatic retro-reflective sign 19 shown in FIG. 4b to a size of 24"×24", then one would have to live with seam lines 13. But the problem gets worse in that if many of these signs were needed, which will most often be the case, then on the next similarly sized sheet cut from the roll, the seam lines will appear, but will be in a different position. The seam lines 13 will invariably appear in different positions for successive sheets cut to this size, as shown in FIG. 4b. Once the graphics 14 were printed onto these signs 19, the obvious ever-changing position of the seams 13 would become even more apparent relative to the graphics.

In making larger signs, impression lines sealed from the top or from the back of the sign is known in the art. This is mostly done when sealing the raw reflective sign material to another support material. But even with such surface sealing, the seam lines are there, and such surface sealing does not synchronize itself with the seam lines, and it is there to form a bonding service only.

The method of production of the reflective sheeting does not matter, the seams 13 as described will always be apparent. However, when a mold grid pattern such as shown at 64 is employed, the seam lines in the finished article become visually non-distinctive. As a result irregularly shaped articles can be stamped from the prismatic retro-reflective sheet 26 without having visually disturbing seam lines. These articles can be made without regard to their position relative to any seam line 13.

Another important area where a mold grid pattern background such as 64 can be used is when making production tooling. Making large seamless surface area molds in sizes such as 9"×9" or 9"×10" utilizing very high-tech diamond turning equipment is extremely costly and time consuming. What this invention provides for is to use a relatively small diamond turned master, such as at a size of 3.25"×3.25". This can be done at a far lower cost and far quicker than a larger mold. The 3.25" square can have fine grid pattern background 17 scribed or detailed with other methods into its surface. Thereafter, a series of electroformed duplicates can be made and "tiled" together: electro forming is not at all costly and will create faithful reproductions of the original. Normal seam lines from such tiling will not matter, because these will be hidden by the mold grid pattern 64. In this way master manufacturing molds of virtually any size can be assembled from a small, original low-cost master.

With a technique of this invention, fine grid pattern lines are added to the molds, which pattern then appears on the raw reflective material. The fine grid lines taught in this invention are not from a heavy bonding or embossing process done as part of sealing together a finished product.

Customers who would be likely to object to a seam line that runs through a product, or to an intersection of seam lines on the product, would not object to a pattern the appears as part of the design of the final article. This would be particularly be the case when small reflector products are involved such as stickers, armbands, wristbands, bicycle reflectors and the like.

Figure 5A:
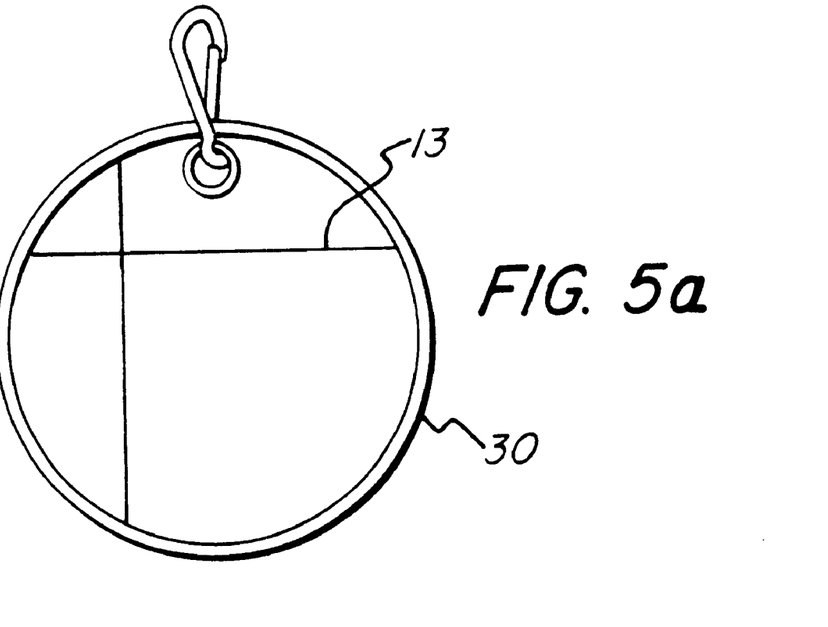
FIG. 5a is a plan view of a retro-reflective article formed into a retro-reflective Zipper Pull where visually disturbing seam lines appear in the product.
Figure 5B:
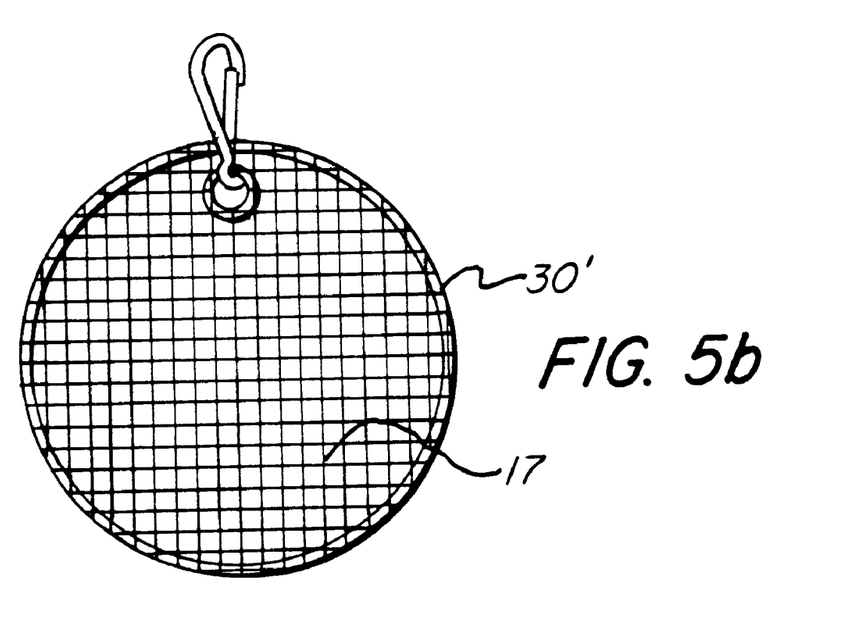
FIG. 5b is a similar plan view as FIG. 5a and shows the same Zipper Pull as in FIG. 5a but where the seam lines of FIG. 5a are now visually disguised on the surface of the article.

FIG. 5a shows the advantage of the invention. While customers may object to unsightly seam lines on a product such as the retro-reflective product in FIG. 5a, they will hardly object to a fine background pattern 17 which might appear on the reflective product as shown in FIG. 5b. In FIG. 5a a reflective zipper pull product 30 is shown which was made with reflective material where seam lines 13 appeared on the material. FIG. 5b shows the same reflective product 30' made with reflective material, which had 1/8" grid pattern 17 as its background, with the seam lines 13 now hidden by the presence of the grid background.

Figure 6A:
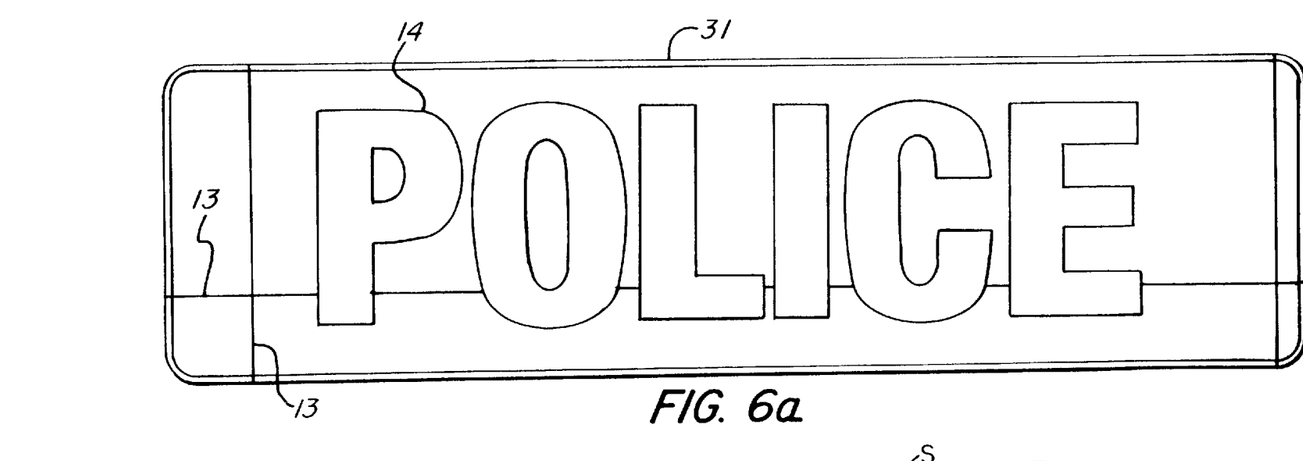
FIG. 6a is a plan view of a retro-reflective sign showing seam lines left from the use of conventional abutting dies in making the article.
Figure 6B:
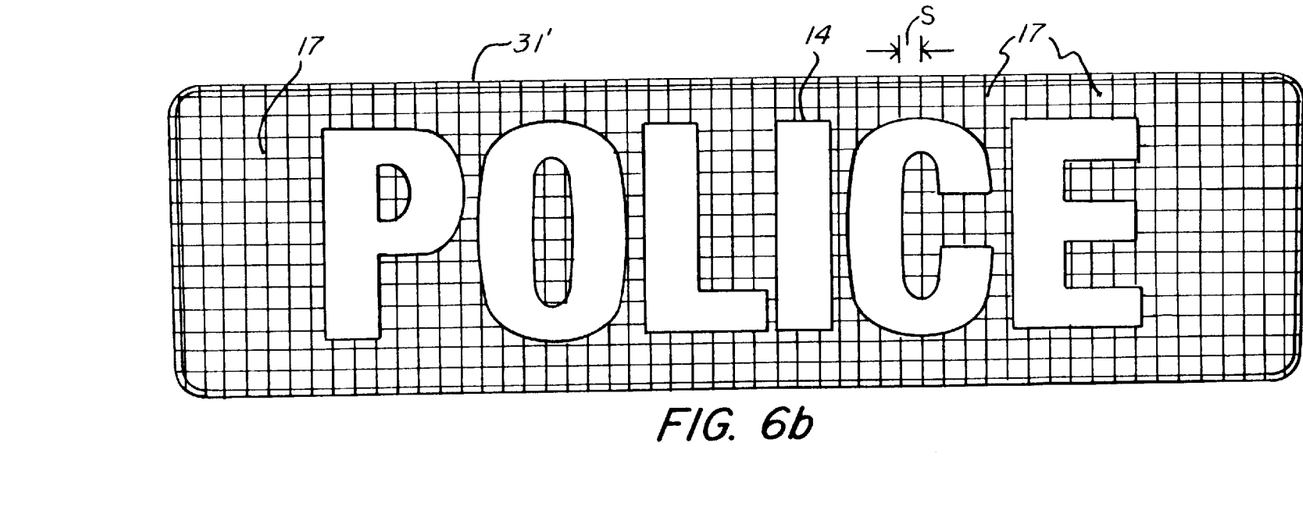
FIG. 6b is a plan view of the sign of FIG. 6a, but where the irregularly appearing seam lines have been disguised within a grid line structure in accordance with the invention.

FIG. 6a shows a large reflective emblem 31 which emblem is used on a safety vest with "POLICE" graphics 14 printed on the emblem. The seam lines 13 on the reflective material as part of its original manufacture are very obvious. FIG. 6b shows the same reflective emblem 31' where a 3/16" grid pattern background 17 in accordance with this invention successfully disguised the mold seam lines 13.

Typically the grid lines 17 could be spaced apart in a range from 1/16" to 1/2" depending on what the end use of the product was to be. For example, in the case of small reflective products such as zipper pulls and bicycle reflectors, the grid lines 17 would be in the region of 1/8" apart or perhaps even 3/16" apart.

These grid lines 17 can be introduced to the mold in a number of ways. It could be done on the original diamond turned mold. It is preferable to actually do this on the first electroformed master at its original size when it was for example 9"×10". One method of creating the lines is to scribe them into the mold with a very fine, sharp tool. Another way is to have the lines photo etched into the electroformed mold. Alternatively they can be lightly stamped into the mold with a sharp-edged cutting bar. They can also be lightly laser engraved, or applied in other ways. When wrapping the grid-patterned mold 10' around the manufacturing machine cylinder, if the cylinder is built correctly with tightening adjustment, one can easily line up the grid pattern lines so that they come together at the required distance apart: i.e. at the same distance as the general grid pattern on the mold.

In an alternative embodiment, rather than grid lines 17 being introduced into the molds used to form retro-reflective sheet 23a, grid lines 17 can be formed directly on or in retro-reflective sheet 23a itself during or after creation. For example, grid lines 17 can be printed or etched onto a surface thereof. The grid lines may be formed either on a front, smooth surface 100 or a rear prism-containing surface 102 of retro-reflective sheet 23a (see FIG. 1a), and may be formed, for example, by scribing them into sheet 23a with a tool, by stamping them into sheet 23a, by using a laser to etch them into sheet 23a, by printing them on sheet 23a, or by combinations of these or other undisclosed methods. Moreover, grid lines 17 may be formed in sheet 23a while it is in an unfinished state (see FIG. 1a and FIG. 3), or after it has been shaped into a finished or partially finished product (see FIG. 5b and FIG. 6b).

The grid lines 17 could be made extremely fine and delicate in appearance. It is preferable to make them perhaps slightly less pronounced than the actual seam lines 13 that join the mold plates together. This way very little reflectivity is lost when one has to "damage" some prisms to create the grid lines, and the difference in thickness of the grid lines versus the seam lines will hardly be noticed on the reflective material. A fine grid pattern such as 1/8" apart or 3/16" apart will create a somewhat high-tech look and a pleasing background appearance.

One of the key advantages of material produced in this manner is the flexibility it will provide when utilizing roll goods for manufacturing reflective products. One will no longer be restricted to certain finished product fabrication die sizes especially when making small reflectors in order to dodge the seam lines. Material can now be rolled off the master rolls and cut to any size for fabricating: Material sizes can now suit best economics on sealing machines; Material can be cut to any size such as to suit printing machines which produce the printed graphics; Reflective material can be cut to sizes which suit other materials to which it to be bonded. All of this will provide the best economics in manufacturing, and no longer will one be restricted by seam lines and concerned in how to avoid them.

The present invention, therefore, provides a way to eliminate the visually disturbing appearance of seams on retro-reflective materials made from prismatic manufacturing molds.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A process for producing a prismatic reflective material in which no join lines or seam lines are apparent, comprising the steps of:

providing at least one mold having prismatic elements therein for making a prismatic retro-reflector with the at least one mold in a thermoplastic substrate;

abutting edges of the at least one mold to form a mold structure wherein the abutting edges of the mold form a seam line;

forming a retro-reflective thermoplastic sheet with the at least one mold wherein the retro-reflective sheet has a seam line corresponding to the seam line formed by the edges of the at least one mold; and forming a grid pattern on or in the retro-reflective thermoplastic sheet, which grid pattern is positioned such that the seam line in the retro-reflective thermoplastic sheet becomes a part of the grid pattern to be effectively obscured thereby.

2. The process of claim 1 wherein the grid pattern is printed on a surface of the retro-reflective thermoplastic sheet.

3. The process of claim 1 wherein the grid pattern is etched on a surface of the retro-reflective thermoplastic sheet.

4. The process of claim 1 wherein the grid pattern is formed on a surface of the retro-reflective thermoplastic sheet by a method selected from the group consisting of scribing the grid pattern into the retro-reflective thermoplastic sheet with a tool, stamping the grid pattern into the retro-reflective thermoplastic sheet, using a laser to etch the grid pattern into the retro-reflective thermoplastic sheet, printing the grid pattern into the retro-reflective thermoplastic sheet, or by combinations of these.

5. The process of claim 1 wherein the grid pattern is formed on a front, smooth surface of the retro-reflective thermoplastic sheet.

6. The process of claim 1 wherein the grid pattern is formed on a rear, prism-containing surface of the retro-reflective thermoplastic sheet.

7. The process of claim 1 further comprising the step of die-cutting the retro-reflective thermoplastic sheet to form articles with a regular grid pattern background.

8. A retro-reflective thermoplastic sheet made with the process of claim 1.

9. A process for producing a prismatic reflective material in which no join lines or seam lines are apparent, comprising the steps of:

providing at least one mold having prismatic elements therein for making a prismatic retro-reflector with the at least one mold in a thermoplastic substrate;

abutting edges of the at least one mold to form a mold structure wherein the abutting edges of the mold form a seam line;

forming a retro-reflective thermoplastic sheet with the at least one mold wherein the retro-reflective sheet has a seam line corresponding to the seam line formed by the edges of the at least one mold; and forming a grid pattern on or in the retro-reflective thermoplastic sheet by a method selected from the group consisting of scribing the grid pattern into the retro-reflective thermoplastic sheet with a tool, stamping the grid pattern into the retro-reflective thermoplastic sheet, using a laser to etch the grid pattern into the retro-reflective thermoplastic sheet, printing the grid pattern into the retro-reflective thermoplastic sheet, or by combinations of these, which grid pattern is positioned such that the seam line in the retro-reflective thermoplastic sheet becomes a part of the grid pattern to be effectively obscured thereby.

10. The process of claim 9 wherein the grid pattern is formed on a front, smooth surface of the retro-reflective thermoplastic sheet.

11. The process of claim 9 wherein the grid pattern is formed on a rear, prism-containing surface of the retro-reflective thermoplastic sheet.

12. The process of claim 9 further comprising the step of die-cutting the retro-reflective thermoplastic sheet to form articles with a regular grid pattern background.

13. A retro-reflective thermoplastic sheet made with the process of claim 9.

* * * * *